June 23, 1931.  W. B. BRONANDER  1,810,943
PAN GREASING MACHINE
Filed Oct. 4, 1929   2 Sheets-Sheet 1

INVENTOR
Wilhelm B. Bronander
BY
Sydney H. Prescott
ATTORNEY

June 23, 1931.  W. B. BRONANDER  1,810,943
PAN GREASING MACHINE
Filed Oct. 4, 1929  2 Sheets-Sheet 2
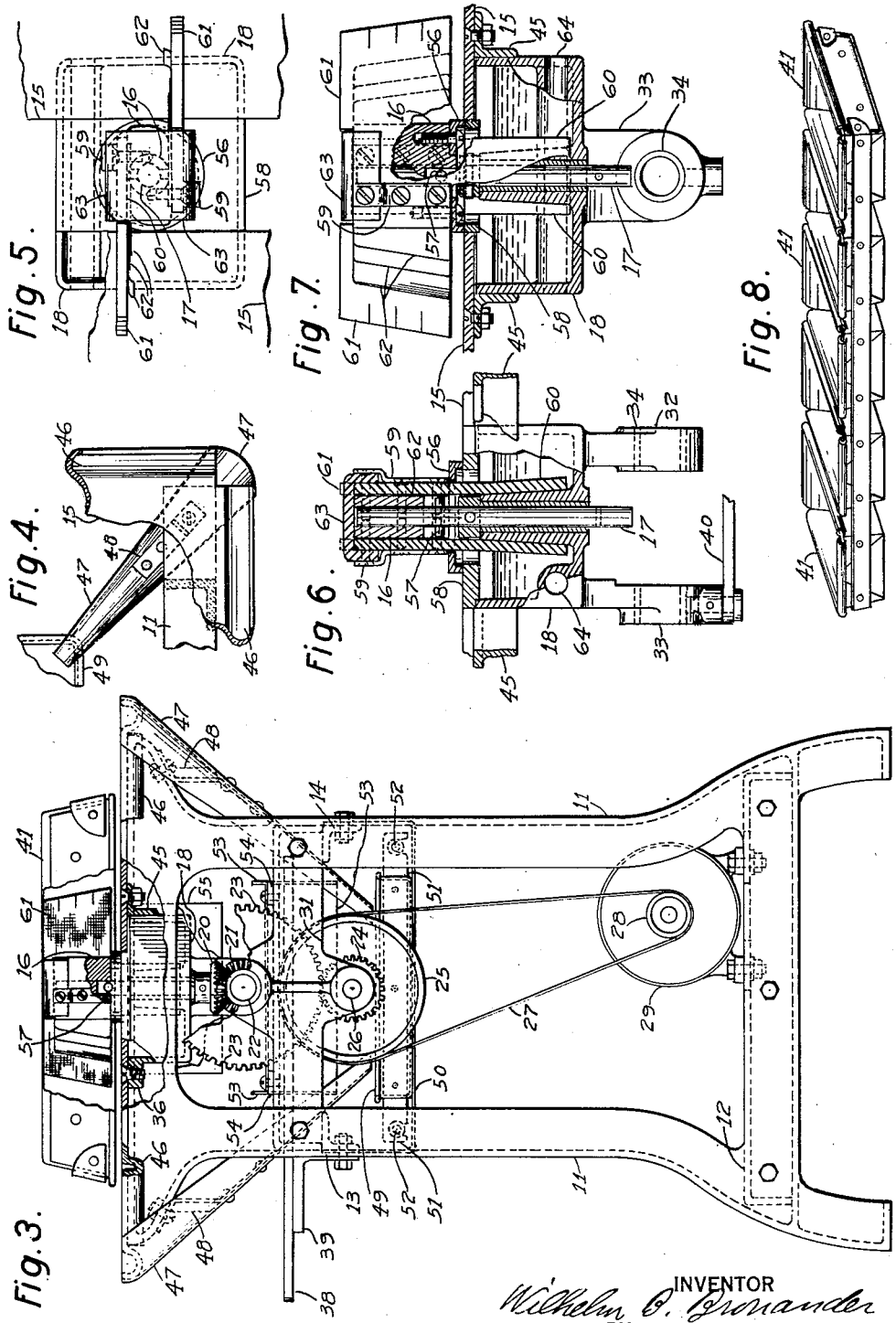

Patented June 23, 1931

1,810,943

UNITED STATES PATENT OFFICE

WILHELM B. BRONANDER, OF MONTCLAIR, NEW JERSEY, ASSIGNOR TO AMERICAN MACHINE & FOUNDRY COMPANY, A CORPORATION OF NEW JERSEY

PAN GREASING MACHINE

Application filed October 4, 1929. Serial No. 397,331.

This invention relates to pan greasing machines such as are used in bakeries to apply grease or oil to groups of pans, for baking bread or cake in quantities.

The pans are commonly united in groups of five or six. Pan greasing machines have been provided with a grease applying head for each pan, and these machines have been constructed so that they may be adjusted to fit variously spaced pans by the laborious process of individually loosening each head or grease unit on its supporting structure and separately positioning them with respect to the other heads to the desired spacing. Since the pans are ordinarily positioned side by side, their centers are generally equi-distant but farther apart for larger pans and nearer together for smaller pans.

It is one of the main objects of the present invention to provide simple and effective means for simultaneously and quickly adjusting each of these heads to fit groups of variously spaced pans, and to this end in the preferred embodiment the heads are so connected as to remain equi-distant during said adjustment.

Still other objects are to provide a wick structure for supplying grease to the pans which will obviate the complicated grease pumping systems and brushes hitherto commonly used, and provide for greasing a larger range of pan sizes without a change of grease applying heads.

With these and other objects not specifically mentioned in view, the invention consists in certain constructions and combinations which will be hereinafter more fully described and then more particularly pointed out in the appended claims.

In the accompanying drawings in which like characters of reference indicate the same or like parts:

Fig. 3 is an end elevation of the pan greasing machine, with parts broken away, to show details of construction;

Fig. 4 is a top view of one of the corners of the operating table showing the grease gutters and one of the grease chutes;

Fig. 5 is a top view, on an enlarged scale, of one of the grease pots and greasing heads;

Fig. 6 is a sectional elevation of the grease pot and greasing head showing in Fig. 5;

Fig. 7 is a sectional side elevation of the structure shown in Figs. 5 and 6; and Fig. 8 is a perspective view of one of the pan units or pan groups to be operated upon by the greasing machine.

Figures 1, 2:
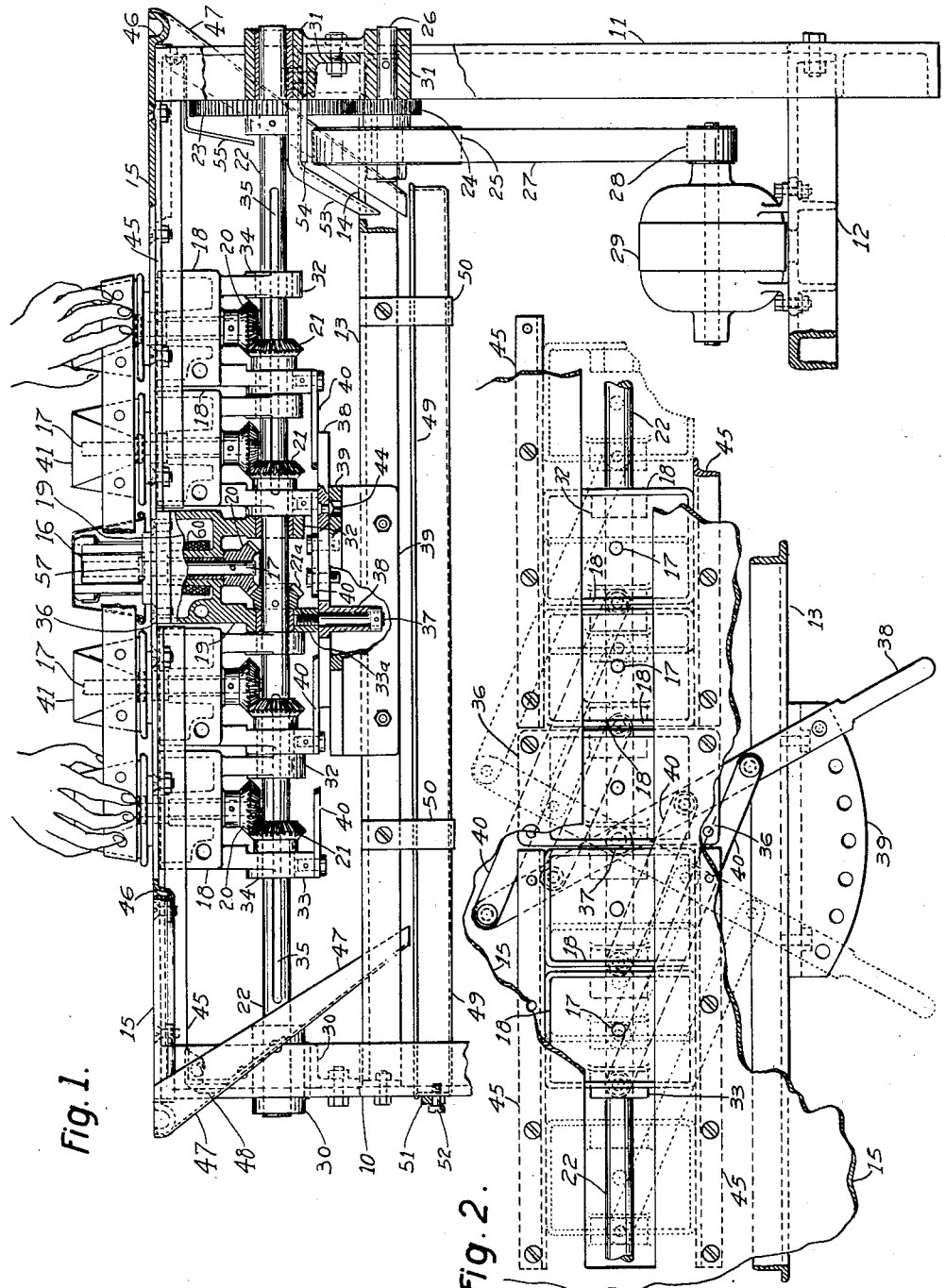
Fig. 1 is a side elevation, partly in cross section, of the improved pan greasing machine, showing the arrangement of the grease pots and the drive of the greasing heads.
Fig. 2 is a top view of the grease pots, showing the arrangement for changing their position to adapt the machine for different pan units.

In carrying the invention into effect there is provided a plurality of spaced pan greasing units, together with means for simultaneously adjusting each of said units relative to the others so as to fit groups of variously spaced pans, and thus avoid the necessity of laboriously adjusting each greasing unit separately with respect to all the other greasing units. In the best constructions, these units include rotatable spindles and the grease applying heads on said spindles, and preferably the driving means for these spindles include gears on the spindles, aligned gears meshing with said spindle gears, and splined shaft slidably mounting and driving said aligned gears, thereby permitting adjustment of the greasing units without disconnecting the driving means. In the best constructions, the adjusting means includes connections maintaining the greasing units equi-distant. In the best form contemplated, is included a rotatable wick supporting head and a wick thereon having a laterally extending pan engaging portion and a dipping portion, together with a grease reservoir receiving said dipping portion. The means above referred to may be widely varied within the scope of the claims, the particular machine selected to illustrate the invention being only one of the many possible concrete embodiments of the same. The invention, therefore, is not to be restricted to the precise details of the device shown.

Referring to Figs. 1 to 4 of the drawings, the end pedestals 10 and 11 which are tied together by the bottom plate 12 and by the side bars 13 and 14, support the table 15, from the longitudinal opening of which project a number of revolving grease applying heads 16. These heads are rotated by the vertical spindles 17 journaled in surrounding grease reservoirs 18, and each driven through like bevel gears 20 on the spindles meshing with aligned gears 21 slidable on a splined horizontal shaft 22, which is rotated by the spur gears 23 and 24 from the pulley 25 mounted on a sleeve of gear 24 on a stud 26 and driven by belt 27 from the pulley 28 of motor 29 adjustably mounted on bottom plate 12. The shaft 22 is supported in bearing brackets 30 and 31 attached to pedestals 10 and 11, respectively, the bearing bracket 31 also carrying the stud 26.

The grease reservoir pots 18 which receive portions of the wicks hereinafter described, have front lugs 32 and rear lugs 33 provided with bushings 34 through which passes the shaft 22, thereby supporting the pots. The bevel gears 21 are slidably mounted on the shaft 22 having splines 35 with which engage keys carried by the gears 21. The central gear 21a is fixedly attached to shaft 22, and the central grease pot 19 has flanges 36 by which it is fastened to the table 15.

The operating lever 38 for positioning the greasing units is fulcrumed on the rear lug 33a of the stationary receptacle 19 on a stud 37 upon which is fulcrumed a double lever 38 which swings over an index plate 39 attached to the side bar 13. The lever 38 is connected by parallel links 40 with the rear lugs 33 of the slidable pots 18 so that, by shifting of lever 38, the grease pots, and with them the spindles 17 and the grease applying heads thereon, i. e. the greasing units, can be simultaneously moved into any one of a number of relative positions corresponding to different center distances between the pans 41 of the pan group to be greased, such as result from different sizes and spacing of pans.

As the pans of a group are ordinarily of the same size and are equally spaced, their centers are equi-distant. To fit such groups the links are connected to the lever at equi-distant points at distances from the fulcrum of the lever proportional to the desired relative distances between the movable greasing heads and the one having a fixed position with respect to the machine frame. Obviously, the invention could be applied to maintaining other proportionate distances between greasing heads than equal ones, while varying the absolute distances between heads.

For convenience and to maintain the greasing units in adjusted positions, the lever 38 has the pointed button 44 registering with holes in the index plate 39 and can thus be quickly set to any pan combination within the range of the machine. The heads 16 are attached to the shafts 17 by a simple coupling connection so that one or more of them can be readily lifted off the machine if the pan unit to be greased has a smaller number of pans than the number of greasing heads provided in the machine. When being moved by the lever 38 on shaft 22, the grease pots 18 are guided by the rails 45 attached to the under side of table 15.

To collect the surplus grease, the table has the gutters 46 which at the corners discharge into chutes 47 attached to the pedestals 10 and 11 by means of the straps 48. The chutes 47 lead into the pan 49 resting on straps 50 suspended from the tie bars 13 and 14. Across the rear end of pan 49 is fastened the bar 51, vertical slots at the end of which engage with pins 52 in rear pedestal 10 when the pan is in place, thereby locking it in position.

To protect the belt and drive gears from dripping grease, a guard chute 53 located over pulley 25 and discharging into drip-pan 49 is attached by means of horizontal bars 54 on either side of gear 23 to the cross arms of bearing bracket 31, and a guard 55 located above spur gear 23 and discharging into chute 52 is attached to the inside wall of pedestal 11 near the table top.

The greasing heads, one of which is shown in detail in Figs. 5, 6 and 7, consist of the oblong body 16 attached to the circular base 56 and provided with a horizontal slot adapted to engage with one of the cross pins 57 in the vertical shafts 17 when resting on the cover 58 of a grease pot 18.

The grease is drawn up from the grease pots and brushed onto the pans by means of the wicks 60 attached, by means of the vertical strips 59 to the body 16. The wicks 60 are of felt or similar material and have dipping portions which pass through slots in the base 56 and dip into the grease contained in the pots 18 and long horizontally extending pan engaging portions or wings 61 which are stiffened or reinforced by a number of thin leaf springs 62 fastened to the sides of body 16 by the screws holding the strips 59. Across the top of body 16 is placed a short piece of wick 63 which serves as a protection for the pans, preventing the greasing head from scratching the same. This piece is held in place by the top screws of the strips 59 and can be readily replaced in case of wear.

The grease pots 18 are provided with circular compartments 64 for the reception of electric heating cartridges which are used when it is necessary to raise the temperature of the grease in order to keep the same in the melted condition.

In view of the foregoing, further description of the operation of the machine is deemed unnecessary and is omitted for the sake of brevity.

What is claimed is:

1. In a pan greasing machine, the combination with a plurality of spaced pan greasing units, of lever means for simultaneously adjusting each of said units relative to the others to fit groups of variously spaced pans.

2. In a pan greasing machine, the combination with a plurality of spaced pan greasing units, of lever means for simultaneously adjusting each of said units relative to the others to fit groups of variously spaced pans, said units comprising rotatable spindles and grease applying heads thereon, and driving means for said spindles.

3. In a pan greasing machine, the combination with a plurality of spaced pan greasing units, of means for simultaneously adjusting each of said units relative to the others to fit groups of variously spaced pans, said units comprising rotatable spindles and grease applying heads thereon, and driving means for said spindles including gears on said spindle, aligned gears meshing with said spindle gears and a splined shaft slidably mounting and driving said aligned gears.

4. In a pan greasing machine, the combination with a plurality of spaced pan greasing units, of means for simultaneously adjusting each of said units relative to the others to fit groups of variously spaced pans, said units including rotatable wick supporting heads, wicks thereon each having a pan engaging portion and a dipping portion, and grease reservoirs receiving said dipping portions.

5. In a pan greasing machine, the combination with a plurality of spaced pan greasing units, of lever means for simultaneously adjusting each of said units relative to the others to fit groups of variously spaced pans, said means including connections maintaining said units equi-distant.

6. In a pan greasing machine, the combination with a plurality of spaced pan greasing units, of means for simultaneously adjusting each of said units relative to the others to fit groups of variously spaced pans, said means including a single operating lever and link connections maintaining said units equi-distant.

7. In a pan greasing machine, the combination with a plurality of spaced pan greasing units, of means for simultaneously adjusting each of said units relative to the others to fit groups of variously spaced pans, one of said units having a fixed position, said means including a single operating lever and links connected to the remaining units and to said lever at distances from the fulcrum thereof proportional to a desired set of distances between said fixed unit and said remaining units.

8. In a pan greasing machine, a rotatable wick supporting head, a wick thereon having a laterally extending pan engaging portion and a dipping portion, and a grease reservoir receiving said dipping portion.

9. In a pan greasing machine, a rotatable wick supporting head, a wick thereon having a laterally extending pan engaging portion and a dipping portion, and a grease reservoir receiving said dipping portion, and yielding means stiffening the laterally extending portion of said wick.

10. In a pan greasing machine, a rotatable wick supporting head, a wick thereon having a laterally extending pan engaging portion and a dipping portion, and a grease reservoir receiving said dipping portion, and a leaf spring stiffening the laterally extending portion of said wick.

11. In a pan greasing machine, a wick supporting head, a spindle for rotating said head, a wick on said head having a laterally extending pan engaging portion and a dipping portion extending along said spindle, and a grease reservoir surrounding said spindle and receiving said dipping portion.

In testimony whereof, I have signed my name to this specification.

WILHELM B. BRONANDER.